UNITED STATES PATENT OFFICE.

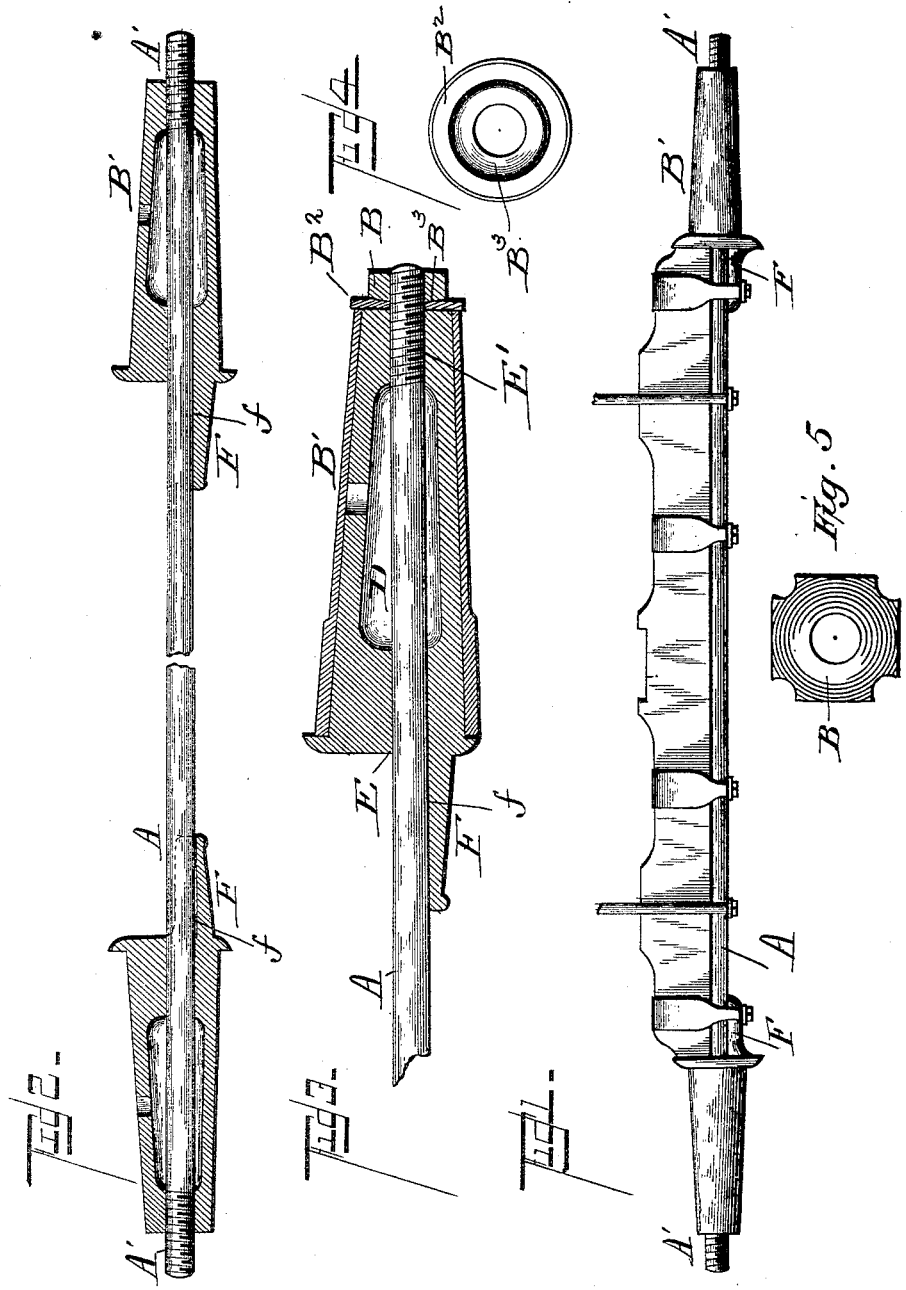

JOHN A. JOHNSON, OF MADISON, AND TARGE G. MANDT, OF STOUGHTON, WISCONSIN.

VEHICLE-AXLE.

SPECIFICATION forming part of Letters Patent No. 460,873, dated October 6, 1891.

Application filed April 8, 1891. Serial No. 388,137. (No model.)

*To all whom it may concern:*

Be it known that we, JOHN A. JOHNSON, of Madison, Dane county, Wisconsin, and TARGE G. MANDT, of Stoughton, in the county of Dane and State of Wisconsin, have invented certain new and useful Improvements in Vehicle-Axles; and we do hereby declare that the following is a full, clear, and exact description of the invention, which will enable others skill in the art to which it appertains make and use the same, reference being had to the accompanying drawings, which form a part of this specification.

Our invention relates to vehicle-axles, and is designed as an improvement upon the invention disclosed in Letters Patent granted to us March 18, 1890, No. 423,776.

The present invention consists in the novel construction and combination of parts hereinafter fully described, and specifically pointed out in the claim.

In the accompanying drawings, Figure 1 is a side view of our improved axle with the skeins complete and ready for use, but both of the nuts having been removed. Fig. 2 is a longitudinal sectional view of the same. Fig. 3 is a sectional detail view, on an enlarged scale, of one end of the axle with the box on. Fig. 4 is a detail view of the washer, and Fig. 5 is a similar view of the nut.

Reference being had to the said drawings, the letter A denotes the axle proper, which is made round or cylindrical, of steel, iron, or other suitable metal. This axle, as will appear from the drawings, is perfectly straight, with its ends A' screw-threaded to adapt them to receive the convex nuts B and the skeins or thimbles.

The letter B' designates the boxes, fitting on the skeins, and intermediate of the boxes and the nuts is a washer $B^2$, (see Fig. 4,) concaved or recessed on its outer face, so as to bear close up against said box, the nut B being made convex on its inner face to fit in said concave in the washer.

The skeins or thimbles are of the construction shown more clearly in Fig. 2 of the drawings—that is to say, they are cast hollow with a recess D, and bored through longitudinally, but not centrally—that is to say, the bore E is made to fit the axle closely on a slant or incline corresponding to the pitch and "gather" which the wheel is to have and nearer the under side of the skein than the upper, so that the skeins will be set at the proper angle relative to the body of the axle without the necessity of bending the ends of the latter, so that the axle may be left perfectly straight from one end to the other.

The outer end of the bore E (denoted by the letter E') is threaded, so that the skein may be securely (yet removably) fastened by screwing it upon the threaded ends of the axle. As an additional means of fastening, the shoulders or bearings F F, which are integral with and project rearwardly from the skeins, so as to bear against the under side of the axle in the usual manner, are recessed, as shown at $f$, so as to form a semi-cylindrical chamber surrounding the corresponding portion of the axle on the under side, and after the skein has been adjusted in its proper position upon the axle this chamber or recess $f$ is filled with Babbitt metal or some other composition possessing the same qualities, by means of which (in addition to the threaded end of the axle) the skein is fastened and held securely in its position, or, if preferred, the bearings F F may be left full in the metal and bored out when the skein is bored, so as to exactly fit the axle.

The present invention possesses all the advantages of the invention set forth in the patent before referred to, and by means of the concave washer $B^2$ and convex nut there will be no necessity of slanting the ends of the axles, as said washer will bear closely and snugly against the skein-box. As seen in Fig. 4, this washer consists of a metal disk having a central aperture for the passage of the axle, its outer face being concaved, as seen at $B^3$.

Having thus described our invention, what we claim is—

As an improved article of manufacture, a metallic axle for vehicles comprising the following elements in the specified combination, viz: a straight round axle having its ends screw-threaded, the removable hollow skeins bored through slantingly and eccentrically, the outer end being threaded to adapt it to be screwed upon the outer ends of the straight axle at a pitch or incline, the convex nuts, and the washers interposed between said nuts and the ends of the skeins, having their inner faces plain and their outer faces, which engage with the convex nuts, made concave, substantially as described.

In testimony that we claim the foregoing as our own we have hereunto affixed our signatures in presence of two witnesses.

JOHN A. JOHNSON.
TARGE G. MANDT.

Witnesses:
W. R. BAGLEY,
O. H. SUERIG.